(12) United States Patent
Goodrich et al.

(10) Patent No.: US 6,403,682 B1
(45) Date of Patent: Jun. 11, 2002

(54) SPANDEX CONTAINING QUATERNARY AMINE ADDITIVES

(75) Inventors: Charles William Goodrich; Charles Francis Palmer, Jr.; Gordon William Selling, all of Waynesboro, VA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/894,118

(22) Filed: Jun. 28, 2001

(51) Int. Cl.[7] ........................ C08K 5/3445; C08K 5/19; C08K 5/205; C08L 15/04
(52) U.S. Cl. ........................ 524/106; 524/190; 524/236; 524/590
(58) Field of Search ................................ 524/106, 198, 524/236, 590

(56) References Cited

U.S. PATENT DOCUMENTS

| | | |
|---|---|---|
| 3,294,752 A | 12/1966 | Wilkinson |
| 3,555,115 A | 1/1971 | Bottomley et al. |
| 5,539,037 A | 7/1996 | Iqbal |
| 5,948,875 A | 9/1999 | Liu et al. |
| 5,981,686 A | 11/1999 | Waldbauer, Jr. |

*Primary Examiner*—Peter Szekely

(57) ABSTRACT

Spandex having improved heat-set efficiency, obtained by incorporating certain quaternary amine additives into the spinning solution, is provided.

10 Claims, No Drawings

SPANDEX CONTAINING QUATERNARY AMINE ADDITIVES

BACKGROUND OF THE INVENTION

1. Field of the Invention

This invention relates to spandex containing quaternary amine additives and, more specifically, to additives where quaternary amine groups are incorporated into a polyurethane oligomer or are part of a nonoligomeric structure.

2. Description of Background Art

Spandex and spandex-containing fabrics and garments are typically heat-set to provide the fiber or fabric with good dimensional stability and to shape the finished garment. Typical heat-setting temperatures used in commercial operations are 195° C. for fabrics containing spandex and 6,6-nylon, 190° C. when the fabric contains 6-nylon, and 180° C. when the fabric contains cotton. It is desirable to heat-set fabrics containing cotton and spandex, but if the spandex has adequate heat-set efficiency only at temperatures used for nylon-containing fabrics, the spandex cannot be properly heat-set in cotton-containing fabrics, which will be damaged by exposure to the required high temperatures. A variety of methods have been used to improve the heat-set efficiency of spandex and thereby lower the temperature at which the spandex can be heat-set. For example, U.S. Pat. No. 5,539,037 discloses the use of low concentrations of alkali metal carboxylates and thiocyanate in spandex to increase its heat-set efficiency. However, such salts are readily dissolved during fabric processing, and their effectiveness is thereby reduced. U.S. Pat. Nos. 5,948,875 and 5,981,686 disclose the use of high proportions of 2-methyl-1,5-pentanediamine and 1,3-diaminopentane chain extender, respectively, to increase the heat-set efficiency of spandex, but making such changes to the polymer can deleteriously affect the fiber properties, and the production flexibility possible with additives is lost.

According to U.S. Pat. No. 3,294,752, quaternary amine moieties can be chemically incorporated into the segmented polyurethane chain from which spandex is made, but there is no disclosure of such incorporation on the effect, if any, on heat-set efficiency and such spandex may suffer from the same deficiency as other polymer chains so modified, namely altered fiber properties and inflexible production and spandex product lines. The use of quaternary amines as additives in spandex is unknown.

A convenient, durable, and flexible means of improving the heat-set efficiency of spandex is still needed.

SUMMARY OF THE INVENTION

The present invention is a spandex containing about 3–100 meq of quaternary amine functionality/kg of spandex wherein the quaternary amine is an additive selected from the group consisting of:

(a) oligomers comprising the reaction product of at least one diisocyanate selected from the group consisting of 1-isocyanato-4-[(4-isocyanatophenyl)methyl]benzene, 1-isocyanato-2-[(4-isocyanatophenyl)methyl]benzene, 4-methyl-1,3-phenylene diisocyanate, 5-isocyanato-1-(isocyanatomethyl)-1,3,3-trimethyl-cyclohexane, 1,6-diisocyanatohexane and bis(4-isocyanatocyclohexyl) methane), and at least one quaternary amine selected from the group consisting of N,N-dialkyl-N,N-dialkanolammonium chlorides and N,N-dialkyl-N,N-dialkanolammonium alkylsulfates, wherein the alkanol grouping contains 2–4 carbon atoms;

(b) quaternary amines having the formula

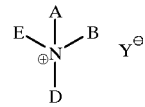

wherein at least one of A, D and E is an alkyl or alkenyl group having about 10–22 carbon atoms, a mixture of such groups, or such groups including an

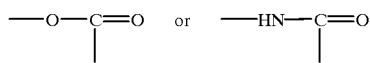

moiety, B is an alkyl group having up to three carbon atoms, D is selected from the group consisting of A, linear and branched alkyl and alkenyl groups having 1–9 carbon atoms, phenyl, benzyl, and —(CH$_2$CH$_2$O)$_y$H groups wherein y is 1–10, and Y is either chloride or alkylsulfate ion; and (c) quaternary amines having the formula

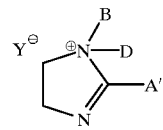

wherein A' is an alkyl or alkenyl group having about 9–21 carbon atoms, B is an alkyl group having up to three carbon atoms, D is selected from the group consisting of A, linear and branched alkyl and alkenyl groups having 1–9 carbon atoms, phenyl, benzyl, and —(CH$_2$CH$_2$O)$_y$H groups wherein y is 1–10, and Y is either chloride or alkylsulfate ion.

DETAILED DESCRIPTION OF THE INVENTION

As used herein, "spandex" means a manufactured fiber in which the fiber-forming substance is a long-chain synthetic elastomer comprised of at least 85% by weight of a segmented polyurethane; "BDMSA" means N-benzyl-N,N-dimethyl-N-stearylammonium chloride; "fatty acid" means any of the saturated or unsaturated monocarboxylic acids, usually with an even number of carbon atoms, that occur naturally in fats and fatty oils.

It has now been found that certain quaternary amine additives in spandex result in surprising increases in the heat-set efficiency of the spandex. It is preferred that the normalized value of heat-set efficiency differences (as defined below) should be at least 0.1.

Spandex is conventionally made by first mixing a polyether, polyester, or polycarbonate glycol with a diiso cyanate to form a mixture of isocyanate-terminated polymeric glycol and unreacted diisocyanate, which is also called a "capped glycol". Examples of useful polyether glycols include poly(tetramethyleneether)glycol and poly (tetramethylene-co-2-methyltetramethyleneether)glycol. Examples of useful polyester glycols include those made from the polycondensation of low molecular weight diols, for example 2,2-dimethylpropanediol, ethylene glycol, butanediol, and mixtures thereof, with dicarboxylic acids such as adipic acid and dodecanedioic acid. Useful polycarbonates include poly(pentane-1,5-carbonate)diol and poly (hexane-1,6-carbonate)diol. The most widely used diisocyanate is 1-isocyanato-4-[(4-isocyanatophenyl)methyl] benzene, but other diisocyanates such as 1-isocyanato-2-[(4-isocyanatophenyl)methyl]benzene, 5-isocyanato-1-(isocyanatomethyl)-1,3,3-trimethylcyclohexane, 4,4'-methylene-bis(cyclohexylisocyanate), and 4-methyl-1,3-phenylene diisocyanate can also be used, either alone or in mixtures. When a spandex is desired which comprises the polyurethaneurea sub-class of polyurethanes, the capped glycol is dissolved in a suitable solvent and chain-extended with a diamine to form a polymer solution. Suitable solvents include dimethylacetamide (DMAc), N-methylpyrrolidone, and dimethylformamide. Useful diamine chain extenders include ethylenediamine, 2-methyl-1,5-pentanediamine, 1,2-propanediamine, 1,3-pentanediamine, 1,4-cyclohexanediamine, 1,3-cyclohexanediamine, 1,3-propanediamine and mixtures thereof. The molecular weight of the polyurethane can be controlled by the use of monofunctional chain terminators such as diethylamine.

The solution can then be dry-spun from a spinneret into a column supplied with hot gas to drive off the solvent and form the spandex, which is wound up into a package.

In one embodiment of the present invention, the spandex additives are polyurethane oligomers prepared from at least one diisocyanate selected from the group consisting of 1-isocyanato-4-[(4-isocyanatophenyl)methyl]benzene, 1-isocyanato-2-[(4-isocyanatophenyl)methyl]benzene, 4-methyl-1,3-phenylene diisocyanate, 5-isocyanato-1-(isocyanatomethyl)-1,3,3-trimethylcyclohexane, 1,6-diisocyanatohexane, bis(4-isocyanatocyclohexyl)-methane) and at least one quaternary amine selected from the group consisting of N,N-dialkyl-N,N-dialkanolammonium chlorides and alkylsulfates, having 2–4 carbon atoms in the alkanol portion. These oligomers can further incorporate non-quaternized amines, for example N-alkyl-N,N-diethanolamines such as N-t-butyl-N,N-diethanolamine and N-methyl-N,N-diethanolamine. Spandex containing oligomeric additives based on N-t-butyl-N-methyldiethanolammonium- and N,N-dimethyldiethanolammonium ions are preferred due to the availability of the precursor amines. Alkylsulfate counterions are preferred because they are more effective at improving heat-set efficiency.

In another embodiment, the spandex additive is a non-polymeric quaternary amine represented by the general formula I:

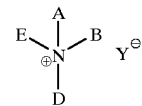

wherein at least one of A, D and E is an alkyl or alkenyl group of about 10–22 carbon atoms, a mixture of such groups or such groups including an

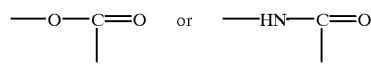

moiety, B is an alkyl group having up to three carbon atoms, and Y is either chloride or alkylsulfate ion, for example methylsulfate or ethylsulfate.

In a preferred embodiment,
"A" is $(CH_3)_a(CH)_b$—$(CH_2)_c$—$(CH=CH)_d$—$(CH_2)_e$—$X_f$—$(CH[CH_3])_g$—$(CH_2)_h$—$(N[CH_2CH(OH)CH_3]CH_2CH_2)_i$—
wherein:
a is 1 or 2,
b is 0 when a is 1 and b is 1 when a is 2,
c is 5–18,
d and f are independently 0 or 1, provided that when f=1, then if the in-chain heteroatom of X is closer to the quaternary nitrogen atom than the carbonyl group, then g+h≧2, and if the heteroatom is farther, then g+h≧1,
e is 0–10,
g and i are 0 or 1,
h is 0–3,
the sum a+b+c+2d+e+g+h is about 10–22, and
"X" is selected from the group consisting of ester and amide;
"B" is an alkyl group of up to 3 carbon atoms;
"D" is selected from the group consisting of "A", linear and branched alkyls and alkenyl groups having 1–9 carbon atoms, phenyl, benzyl, and —$(CH_2CH_2O)_yH$ groups wherein y is 1–10;
"E" is selected from the group consisting of "B", —$(CH_2CH_2O)_yH$ wherein y is 1–10, and 2-hydroxypropyl, and
"Y" is alkylsulfate ion, for example methylsulfate or ethylsulfate. These ions are preferred because quaternary amines with such ions are more effective at improving heat-set efficiency.

Alternatively, formula I can be replaced by formula II, wherein B, D and Y are as above and A' is an alkyl or alkenyl group having about 9–21 carbon atoms:

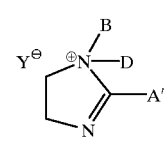

For another preferred quaternary amine additive providing a spandex with higher heat-set efficiency, Formula I is as follows:

"A" is $(CH_3)$—$(CH_2)_c$—$(CH=CH)_d$—$(CH_2)_e$ wherein c is 10–18 d and e are independently 0 or 1, and the sum c+2d+e is about 10–22,

"B" and "E" are each methyl;

"D" is selected from the group consisting of "A" and linear and branched alkyl and alkenyl groups having 1–9 carbon atoms; and "Y" is alkylsulfate ion.

For improved solubility in DMAc, it is preferred that "D" be selected from linear and branched alkyl and alkenyl groups having 1–9 carbon atoms.

Yet another preferred quaternary amine additive which can provide spandex with higher heat-set efficiency is an oligomer comprising the reaction product of bis(4-isocyanatocyclohexyl)methane and at least one quaternary amine chosen from N-t-butyl-N-methyl-N,N-diethanolammonium alkylsulfate, N,N-dimethyl-N,N-diethanolammonium alkylsulfate, and mixtures thereof and, optionally, N-t-butyldiethanolamine.

The quaternary amine additives are effective at improving heat-set efficiency in spandex prepared from, for example, poly(tetramethylene-co-2-methyltetramethyleneether) glycol, 1-isocyanato-4-[(4-isocyanatophenyl)methyl] benzene, and ethylenediamine but somewhat less effective when incorporated into spandex which already has a high heat-set efficiency, for example spandex prepared from poly(tetramethyleneether)glycol, 1-isocyanato-4-[(4-isocyanatophenyl)methyl]benzene, ethylenediamine, and 2-methyl-1,5-pentanediamine, especially at high heat-set temperatures (for example, in excess of about 185° C.).

The quaternary amine additives can usually be dissolved in the spinning solvent and the resulting solution added to the polymer spinning solution. When other additives such as stabilizers and pigments which require milling are also to be added, a slurry masterbatch comprising the quaternary amine, the other additives, spinning solvent and optionally polyurethane (for viscosity optimization) and a dispersant can be milled and then mixed into the spinning solution.

The quaternary amine additives are used at levels of about 3–100 meq of quaternary amine per kg of spandex. The more effective quaternary amines can be used at levels of about 5–35 meq/kg of spandex.

Quaternary amines useful in the present invention include the following:

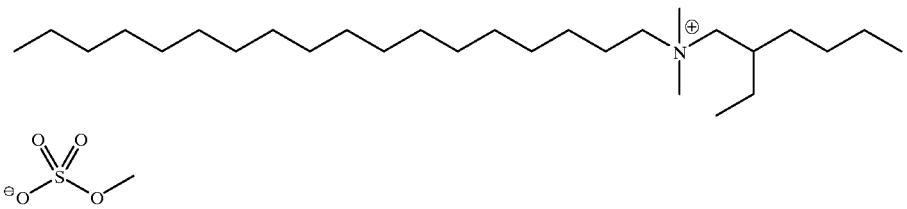

hydrogenated tallow(2-ethylhexyl)dimethylammonium methosulfate (Arquad HTL8-MS-85),

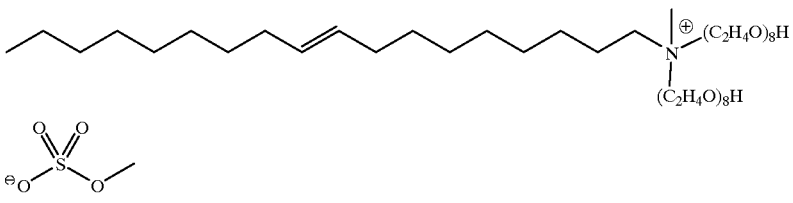

N,N-bis(hydroxyocta[ethyleneether)-N-methyl-N-talloyl-ammonium methylsulfate (Avitex DN-100),

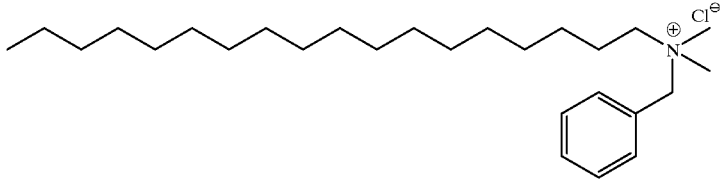

N-benzyl-N,N-dimethyl-N-stearylammonium chloride ("BDMSA"),

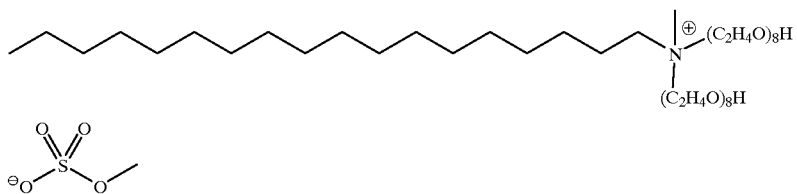
N,N-bis(hydroxyocta[ethyleneether)-N-methyl-N-octadecylammonium methylsulfate,
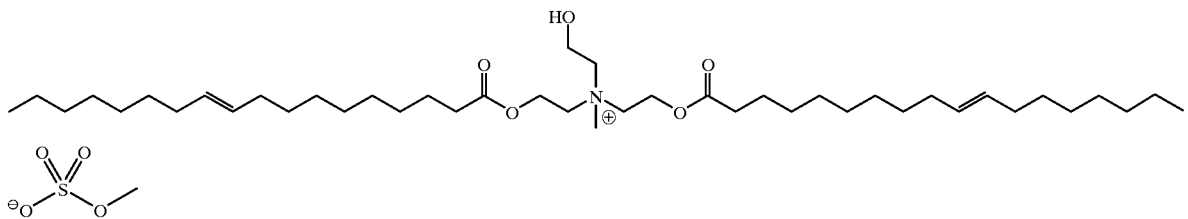
di-(nortallowcarboxyethyl)hydroxyethylmethylammonium methosulfate (Varisoft WE-16),
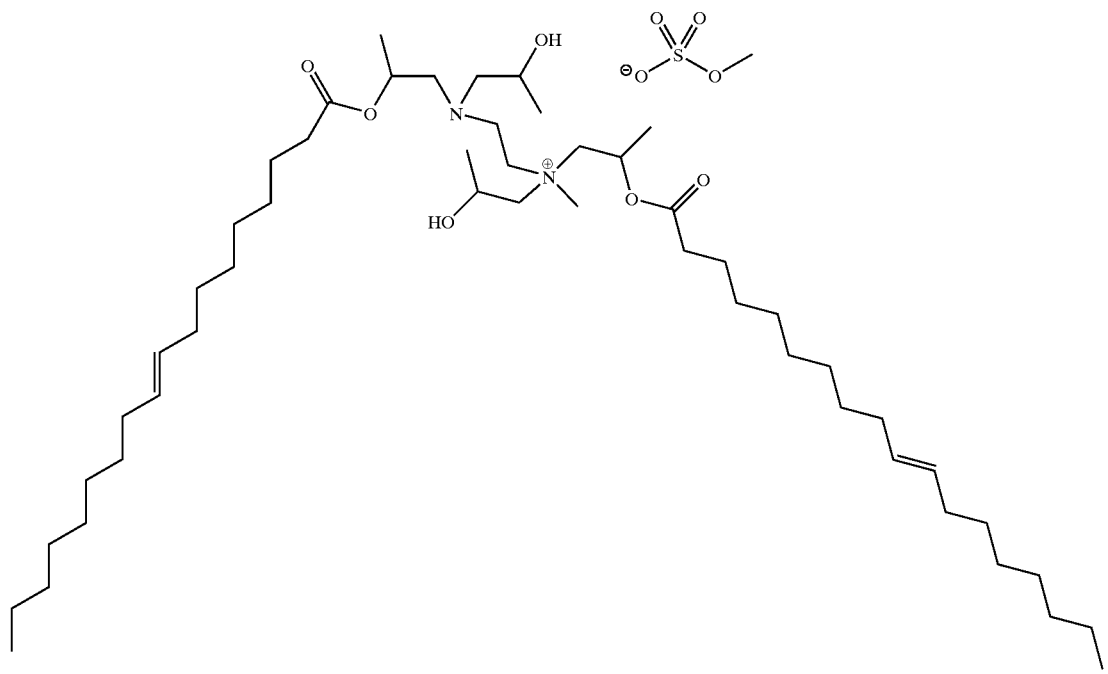
N,N'-bis(2-hydroxypropyl)-N,N'-bis(2-talloylpropyl)-N'-methyl-1-amino-2-ammonioethane methylsulfate (Avitex ML),
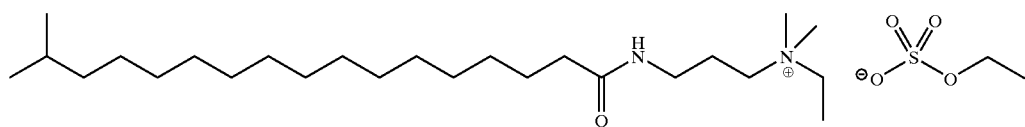

N-(3-isostearylamidopropyl)-N,N-dimethyl-N-ethylammonium ethyl sulfate (Schercoquat IAS),

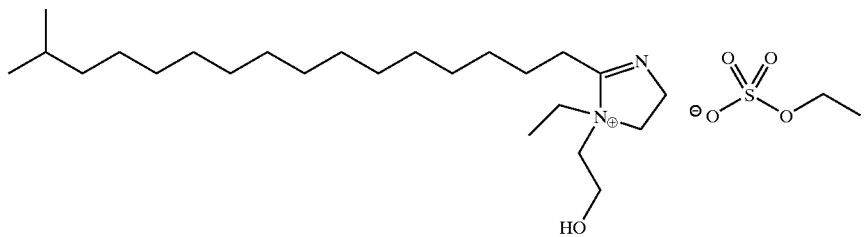

2-isoheptadecyl-1-hydroxyethyl-1-ethyl-imidazolinium ethyl sulfate (Schercoquat IIS),

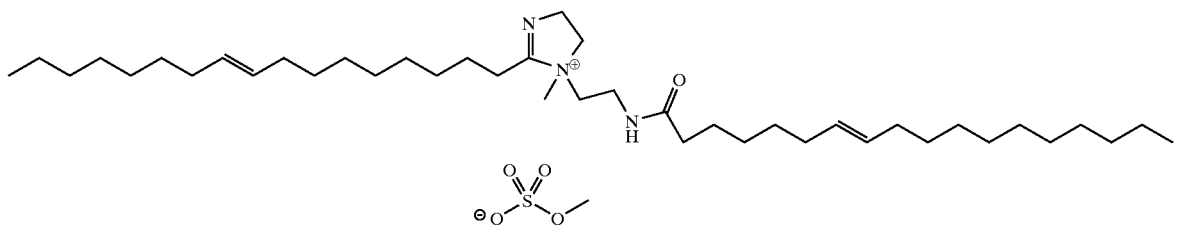

methyl-1-oleyl-amidoethyl-2-oleyl-imidazolinium methyl sulfate (Varisoft 3690),

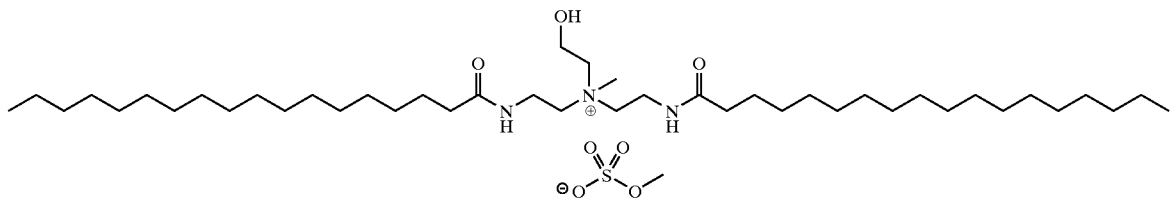

methyl bis(hydrogenated tallow amidoethyl)-2-hydroxyethyl ammonium methyl sulfate (Varisoft 110-75),

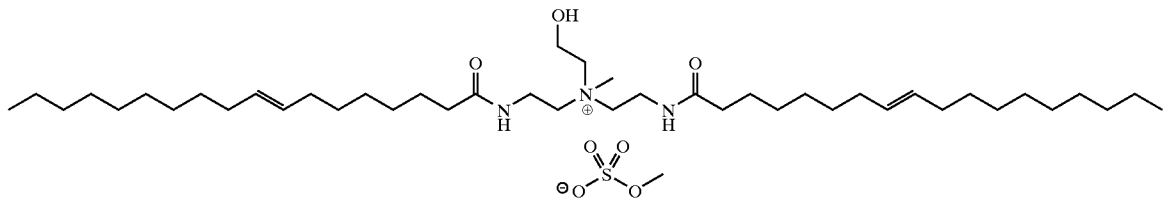

methyl bis(oleylamidoethyl) 2-hydroxyethyl-ammonium methyl sulfate (Varisoft 222-LT),

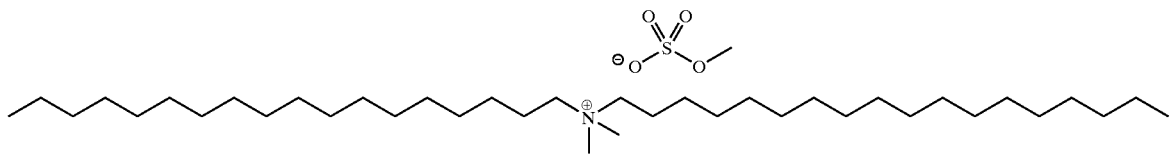

distearyldimethylammonium methosulfate (Sumquat 6045),

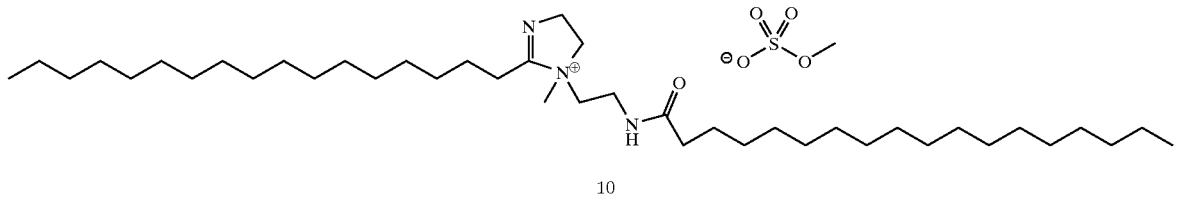

methyl-1-hydrogenated tallow amidoethyl-2-hydrogenated tallow imidazolinium methyl sulfate (Varisoft 445),

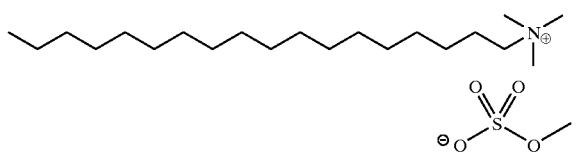

1-octadecyltrimethylammonium methylsulfate,

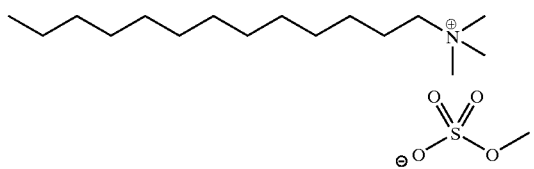

1-tridecyltrimethylammonium sulfate, and

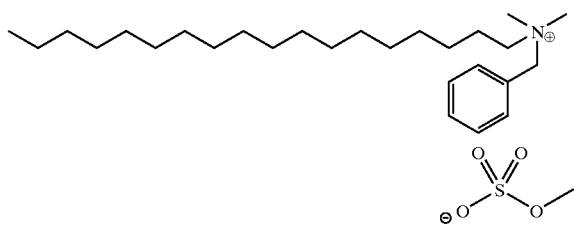

N-benzyl-N,N-dimethyl-N-1-octadecylammonium methylsulfate. Arquad® HTL8-MS-85 is a product of Akzo. Avitex® ML and Avitex® DN-100 are registered trademarks of E. I. du Pont de Nemours and Company. Rewoquat® WE 38 DPG is a product of Witco Corp. Schercoquat® IAS and Schercoquat® IIS are products of Scher Chemical Company. Sumquat® 6045 is a product of Zeeland Chemical. Varisoft® 3690, Varisoft® 110-75, Varisoft® 222-LT-90, Varisoft® 445 and Varisoft® WE16 are products of Witco Corp. N-Benzyl-N,N-dimethyl-N-stearylammonium chloride ("BDMSA") is a product of Aldrich Chemical Company.

Many of the commercially available quaternary amines useful in the spandex of this invention can be derived in a series of steps from naturally occurring mixtures of fatty acids, for example, by amination to an amide, dehydration to a nitrile, reduction to an alkylamine, and finally alkylation to the quaternary amine. The structures shown above are believed to be typical of, and/or the predominant species in, the commercial products.

Various additives useful in the present invention were prepared as follows.

EXAMPLE 1

(A) 1-Octadecyltrimethylammonium methylsulfate was synthesized according to the following procedure. A 2-liter round-bottomed flask was fitted with a mechanical stirrer, thermometer, nitrogen sweep, air-cooled condenser, dropping funnel, and heating mantle. The flask was purged with nitrogen for 15 minutes. DMAc (418 grams) and 1-octadecyldimethylamine (298 grams, 1.00 mole) (Armeen® DM18-D, AKZO) were charged to the flask and stirred. The flask was heated to 80–90° C. Dimethylsulfate (120 grams, 0.950 mole) was added dropwise through the dropping funnel while the temperature of the flask was kept at 90–100° C. After all the dimethylsulfate had been added, stirring was continued for two hours at 90–100° C. A sample of the flask contents on moistened pH paper showed a pH of 7–8, indicating that a small amount of unreacted amine but no unreacted dimethylsulfate were present. The solids content was 51.3 wt % (determined by drying an aliquot overnight in a vacuum oven). The reaction product was a white solid even though it contained about 49 wt % DMAc. The reaction product weighed 795 grams, indicating a yield of 95.1%.

(B) A mixture of quaternary amines in which the single largest component was 1-tridecyltrimethylammonium methylsulfate was prepared by methylation of dimethylcocoamine, a mixture of naturally occurring aliphatic amines, using substantially the same procedure and equipment as for Preparation (A). N,N-Dimethylcocoamine (228 grams, 1.0 mole) (Armeen® DMCD, AKZO), 348 grams DMAc, and dimethylsulfate (120 grams, 0.95 mole) were used at a temperature of 60–70° C. The resulting reaction product was 53.0 wt % solids, weighed 690 grams (99.1% yield), and was a white solid at room temperature in spite of its high DMAc content.

(C) An oligomer of bis(4-isocyanatocyclohexyl)methane with N-t-butyl-N,N-diethanolamine and N,N-dimethyl-N,N-diethanolammonium methylsulfate was prepared in a two-step process.

For the first step, the equipment and procedure used were as for Preparation (A). Under a nitrogen purge, M-methyl-N,N-diethanolamine (357.3 grams; 3.00 moles) was added, the agitator was started, and the flask was heated to 60° C. Dropwise addition of 355.5 grams (2.82 moles) of dimethylsulfate was begun, and the temperature was allowed to rise to 70–80° C. The 0.94-to-1 mole ratio of dimethylsulfate-to-amine was used to ensure complete reaction of the dimethylsulfate. The temperature was maintained at 70–80° C. by heating with the heating mantle or cooling with ice as necessary while the rest of the dimethylsulfate was added. Then the flask was heated to 85–95° C., at which temperature it was stirred for three hours. A drop of reaction mixture placed on moistened Brilliant Yellow indicator paper showed a red color, indicating that unreacted amine remained. The resulting pale yellow liquid weighed 697.0 grams (97.8% yield).

To make the oligomer, N,N-dimethyl-N,N-diethanolammonium methylsulfate (306.6 grams, 1.25 moles), prepared above, bis(4-isocyanatocyclohexyl) methane) (Desmodure® W, Bayer Corporation) (577.0 grams, 2.20 moles), N-t-butyl-N,N-diethanolamine (Tomen Corporation) (201.4 grams; 1.25 moles), and 915 grams of DMAc were charged with agitation to a 3-liter round-bottomed flask fitted with a heating mantle, mechanical agitator, thermometer, nitrogen subsurface sparge and surface sweep, and water-cooled condenser. The flask was purged with nitrogen into and above the mixture while it was slowly heated to 60–65° C. The mixture was held at 60–65° C. for 15 minutes with continuing nitrogen sparge and sweep. The subsurface sparge was stopped, and 0.38 ml (0.40 gram) of dibutyltin dilaurate in DMAc was added all at once. Heating was discontinued, and the temperature was allowed to rise to 80–90° C. The mixture was stirred and heated or cooled as needed to maintain the temperature at 80–90° C. for four hours. A sample checked for the isocyanate infrared band at 2268 cm$^{-1}$ revealed no remaining isocyanate groups. The mixture was cooled to 50–60° C. and removed from the flask affording 1800 grams of a 55.8 wt % solids (determined by drying an aliquot overnight in a vacuum oven; 90% yield), 10,228 cP viscosity, clear, very pale yellow viscous DMAc solution. Tertiary amine content was determined by potentiometric titration with perchloric acid to be 0.23 meq/g. The level of unreacted isocyanate was such that the infrared peak at 2270 cm$^{-1}$ had an absorbance value of 0.035, as Determined with a 0.2-mm CaF$_2$ cell and a calibration curve. Water content was determined to be 0.14 wt % by automated volumetric Karl Fischer titration of a 4 gram sample in a toluene/ methanol 1/1 solvent mixture containing 2 ml of acetic acid.

(D) N-benzyl-N,N-dimethyl-N-1-octadecylammonium methylsulfate was prepared in a two-step process.

First, N-benzyl-N-methyl-N-1-octadecylamine was prepared by alkylation of benzylmethylamine with 1-bromooctadecane using the same equipment used for Preparation A. 1-Bromooctadecane (500.1 grams, 1.5 moles) (Aldrich Chemical Co.) was warmed to 90–100° C. and charged to the flask. A nitrogen sweep and agitation were begun. N-benzylmethylamine (381.8 grams, 3.15 moles) (Aldrich) was then added. The mixture was stirred and heated to about 100–110° C. for 24 hours, then cooled to about 10° C. and stirred for an hour. The reaction product was filtered under vacuum using Number 5 filter paper. Additional liquid was removed from the precipitate by pressing. The filtrate weighed 406 grams. A 0.5-g sample of the filtrate was dissolved in 10 ml of tetrahydrofuran. Gas chromatographic analysis of the sample solution using a 30-m long, 0.25-mm diameter DB-5 column (J&W Scientific), a flame ionization detector, and a programmed run from 50° C. up to 280° C. at 10° C./min revealed the presence of 1.95 wt % residual methylbenzylamine and 0.49 wt % residual 1-bromooctadecane, indicating 97.6 wt % purity of the product benzylmethyloctadecylamine. The crystals on the filter paper were thoroughly rinsed with hexane, and the hexane extract was evaporated in a hood to a constant weight of 122 g. Gas chromatographic analysis as above indicated that the extracted product contained 1.4 wt % 1-bromooctadecane and 1.5 wt % N-methylbenzylamine, indicating a purity of 97.1 wt %. The total yield (filtrate plus extract) was 94.1% of a clear, amber liquid having a density of 0.878 g/ml. The weight of the crystalline N-methylbenzylamine hydrobromide on the filter paper was 285 g (94.1% of theory).

In the second step, a nitrogen sweep was applied to the same equipment as used for Preparation A. N-benzyl-N-methyl-N-1-octadecylamine (384 g, 97.4% pure as determined by GC, 1.0 mole) prepared as described above and DMAc (504 g) were added to the round-bottomed flask. Dimethylsulfate (120 g, 0.95 mole) was added to the dropping funnel. The flask was heated to 60–70° C. with stirring. Dimethylsulfate was added dropwise in 22 minutes to the contents of the flask at 60–70° C. with heating or water bath cooling as needed. Stirring was continued at 60–70° C. for one hour. The pH was checked with moistened pH paper. Stirring and heating was continued for another hour. When the pH was 7–8, the mixture was removed from the flask. Its weight was 995 g (98.7% yield), and it was a solid at room temperature. Aliquots taken while the mixture was hot and evaporated to dryness indicated a solids content of 50.2 wt %. Residual N-benzyl-N-methyl-N-stearylamine was determined by gas chromatography to be 0.022 wt %.

(E) N,N'-Bis(2-hydroxypropyl)-N,N'-bis(2-octadecanoylpropyl)-N'-methyl-1-amino-2-ammonioethane methylsulfate was prepared in two steps. This synthetic procedure probably also resulted in the production of some N,N'-bis(2-hydroxypropyl)-N,N'-bis(2-octadecanoylpropyl)-N,N'-dimethyl-1,2-bis(ammonio)-ethane bis(methylsulfate).

N,N,N',N'-Tetrakis(2-hydroxypropyl)ethylenediamine ("Quadrol", BASF) was heated briefly in an oven to lower its viscosity, after which 360 grams (1.23 moles) was added to a 2-liter fluted flask fitted with nitrogen surface sweep and subsurface sparge, mechanical agitator, a distillation head equipped with a Dean-Stark trap and a condenser, a distillation receiver, a heating mantle, thermal insulation for the flask and distillation head, and a dropping funnel. A vigorous surface nitrogen sweep, moderate subsurface nitrogen sparge, and stirring were begun. The flask was heated to 50–60° C. Using a large powder funnel temporarily positioned at the distillation head neck, 733.5 grams (2.58 moles) of 1-octadecanoic acid (Henckel Corp.) was added at the rate at which it dissolved in the diamine, increasing the temperature to 100° C. as necessary to fully dissolve the acid. The powder funnel was replaced with the distillation head, the flask and distillation head were wrapped with the insulation, and the flask was heated to about 200° C., taking care not to create excessive foaming. The flask was stirred and heated for 3.5 hours, at which time 33.4 g of water had been collected in the trap. The insulation and heating mantle were removed from the flask, which was allowed to cool to 80–90° C. Sodium bisulfite (1.7 grams, 0.016 mole) was added as an antioxidant to control the development of undesirable discoloration in the product. Over 2–3 hours, 190.8 g (1.51 moles) of dimethylsulfate was added, following which stirring and heating at 80–90° C. were continued for another 3 hours. The flask was cooled to 60–70° C., 14.4 grams (0.096 mole) of triethanolamine (Aldrich) was added, and stirring was continued for 30 minutes. The pH was adjusted as needed to 4–5 with triethanolamine, after which the flask was re-heated to 90–100° C. and the contents removed. The product was an off-white waxy solid weighing 1184 grams (91% yield) having a pH in 5% aqueous solution of 4.5.

In spinning spandex containing the quaternary amines prepared in Preparations A through E, the amines were used as prepared without further purification. In the case of Preparations A through D (which contained about 50 wt % DMAc), the amount of amine in the spandex was calculated based on that present in the reaction product.

To determine the heat-set efficiency of the spandex, yarn samples were mounted on a 10 cm frame and stretched 1.5×. The frame (with sample) was placed horizontally in an oven preheated to 190° C. for 120 seconds. The samples were allowed to relax and the frame to cool to room temperature. The samples (still on the frame and relaxed) were then immersed in boiling water for 60 min containing 0.14% Duponol® EP detergent (a registered trademark of E. I. du Pont de Nemours and Company). Then the samples (still on the frame and relaxed) were placed in boiling water at pH=5 (mock dye) for 30 min. The frame and samples were removed from the bath and allowed to dry. The length of the yarn samples was measured and heat-set efficiency (HSE) was calculated according to the following formula:

$$HSE\% = \frac{\text{heat-set length} - \text{original length}}{\text{stretched length} - \text{original length}} \times 100$$

The dyeability of the thusly prepared spandex was also improved when tested with acid dyes such as Acid Blue 113, Acid Black 107, Lanasete® Blue 2R and Lanaset® Brown G (Ciba Specialty Chemicals Corp.), Acid Red 131, Telon Red ERNA (sold by Dystar), and Acid Blue 260 and showed high washfastness.

EXAMPLE 2

Spandex containing quaternary amine additives was prepared as follows. A solution of segmented polyether-based polyurethaneurea elastomer was prepared by thoroughly mixing 1-isocyanato-4-[(4-isocyanatophenyl)methyl] benzene ("MDI") and a copolymer of tetrahydrofuran and 3-methyltetrahydrofuran [poly(tetramethyleneether-co-2-methyltetramethyleneether)glycol, number average molecular weight of 3600 and about 12.5 mole % 2-methyltetramethylenether moieties] in a molar ("capping") ratio of 1.87. The mixture was maintained at a temperature of about 80–90° C. for about 90–100 minutes. The resulting "capped glycol", comprising a mixture of isocyanate-terminated polyether glycol and unreacted diisocyanate, was cooled to 50° C. and mixed with DMAc to provide a solution containing about 45% solids. Then, with vigorous mixing, the capped glycol was reacted for 2–3 minutes at a temperature of about 75° C. with a DMAc solution containing a mixture of diethylamine chain-terminator and ethylene diamine chain-extender. The resulting polymer solution contained approximately 35% solids and had a viscosity of about 2,800 poises at 40° C. To make spinning solutions, the following ingredients were dissolved in DMAc, thoroughly mixed, and added to the polymer solution to provide the listed amounts of additive (expressed as weight percents based on the final weight of spandex without finish):

(a) 1.5% of Cyanox® 1790, a hindered phenolic antioxidant [2,4,6-tris-(2,6-dimethyl-4-t-butyl-3-hydroxybenzyl)isocyanurate], Cytec Industries, (b) 0.5% of Methacrol® 2462B (a polymer of bis(4-isocyanatocyclohexyl)methane and N-t-butyl-N,N-diethanolamine), a registered trademark of E. I. du Pont de Nemours and Company, (c) 0.6% of a silicone oil, (d) 0.4% of Cyasorb® 1164 (2,4-di(2',4'-dimethylphenyl)-6-(2"-hydroxy-4"-n-octyloxyphenyl)-1,3,5-triazine), Cytec Industries, and (e) where applicable, the amount of quaternary amine (wt % based on weight of spandex without finish) as listed in the Table.

When necessary, the additive DMAc mixture was warmed to about 45° C. to make sure the quaternary amine was completely dissolved. The spinning solutions were then conventionally dry-spun to form coalesced nine-filament, 260 denier (289 decitex) yarns.

The effect of quaternary amine additives on spandex heat-set efficiency is reported in Table I. Because the quaternary amines were tested at various weight % levels in the spandex and had various ammonium equivalents per mole of amine, the right-hand column indicates normalized values for differences in HSE from the control (no quaternary amine), obtained by dividing the differences in HSE values by meq of ammonium moiety/kg of spandex. The amines are listed in descending order of effectiveness. Where "Preparation" is indicated, the quaternary amine was that prepared according to the corresponding Preparation described above. "Wt %" means weight percent of quaternary amine based on spandex; "MW" means molecular weight of the quaternary amine; "meq/kg" means meq of quaternary amine/kg of spandex; "ΔHSE" indicates the difference between the control sample and the test sample containing quaternary amine; "n(ΔHSE)" is the normalized value of heat-set efficiency differences obtained by dividing ΔHSE by meq/kg.

TABLE

| QUATERNARY AMINE | HSE % | Wt % | MW | Meq/kg | ΔHSE | n (ΔHSE) |
|---|---|---|---|---|---|---|
| None | 78.5 | — | 0 | 0.0 | 0.0 | 0.0 |
| Sumquat ® 6045 | 84.1 | 0.53 | 662 | 8.0 | 5.6 | 0.70 |
| Preparation A | 87.3 | 0.68 | 423 | 16.1 | 8.8 | 0.55 |
| Preparation B | 87.3 | 0.63 | 354 | 17.8 | 8.8 | 0.49 |
| Preparation C | 82.8 | 0.93 | 2955 | 9.4 | 4.3 | 0.46 |
| Varisoft ® WE16 | 86.4 | 1.93 | 804 | 24.0 | 7.9 | 0.33 |
| Preparation D | 83.5 | 0.80 | 500 | 16.0 | 5.0 | 0.31 |
| Avitex ® DN-100 | 91.6 | 4.86 | 1098 | 44.3 | 13.1 | 0.30 |
| Varisoft ® 3690 | 88.3 | 2.62 | 726 | 36.1 | 9.8 | 0.27 |
| Preparation E | 89.3 | 4.85 | 966 | 50.2 | 10.8 | 0.22 |
| Avitex ® ML | 88.7 | 4.85 | 961 | 50.5 | 10.2 | 0.20 |
| Schercoquat ® IIS | 91.5 | 3.93 | 507 | 77.5 | 13.0 | 0.17 |
| BDMSA | 82.5 | 1.06 | 424 | 25.0 | 4.0 | 0.16 |

The Table shows that all quaternary amines had the desired beneficial effect on the heat-set efficiency of spandex over spandex without the quaternary amine additives of this invention.

What is claimed is:

1. Spandex containing about 3–100 meq of quaternary amine functionality/kg of spandex wherein the quaternary amine is an additive selected from the group consisting of:

(a) oligomers comprising the reaction product of at least one diisocyanate selected from the group consisting of 1-isocyanato-4-[(4-isocyanatophenyl)methyl]benzene, 1-isocyanato-2-[(4-isocyanatophenyl)methyl]benzene, 4-methyl-1,3-phenylene diisocyanate, 5-isocyanato-1-

(isocyanatomethyl)-1,3,3-trimethyl-cyclohexane, 1,6-diisocyanatohexane and bis(4-isocyanatocyclohexyl) methane), and at least one quaternary amine selected from the group consisting of N,N-dialkyl-N,N-dialkanolammonium chlorides and N,N-dialkyl-N,N-dialkanolammonium alkylsulfates, wherein the alkanol grouping contains 2–4 carbon atoms;

(b) quaternary amines having a structure

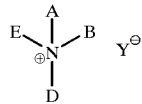

wherein at least one of A and E is an alkyl or alkenyl group having about 10–22 carbon atoms, a mixture of such groups, or such groups including an

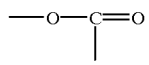

or

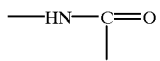

moiety, B is an alkyl group having up to three carbon atoms, D is selected from the group consisting of A, linear and branched alkyl and alkenyl groups having 1–9 carbon atoms, phenyl, benzyl, and —$(CH_2CH_2O)_yH$ groups wherein y is 1–10, and Y is either chloride or alkylsulfate ion; and (c) quaternary amines having a formula

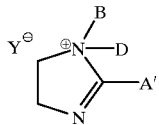

wherein A' is an alkyl or alkenyl group having about 9–21 carbon atoms, B is an alkyl group having up to three carbon atoms, D is selected from the group consisting of A, linear and branched alkyl and alkenyl groups having 1–9 carbon atoms, phenyl, benzyl, and —$(CH_2CH_2O)_yH$ groups wherein y is 1–10, and Y is either chloride or alkylsulfate ion.

2. The spandex of claim 1, wherein the spandex comprises a polyurethaneurea, the quaternary amine is present at a level of about 5–35 meq/kg of spandex, and "Y" is alkylsulfate.

3. The spandex of claim 1, wherein the quaternary amines have the formula

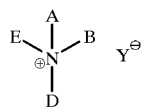

wherein:

"A" is $(CH_3)_a$—$(CH)_b$—$(CH_2)_c$—$(CH=CH)_d$—$(CH_2)_e$—$X_f$—$(CH[CH_3])_g$—$(CH_2)_h$—$(N[CH_2CH(OH)CH_3]CH_2CH_2)_i$— wherein a is 1 or 2, b is 0 when a is 1 and b is 1 when a is 2, c is 5–18, d and f are independently 0 or 1, provided that when f=1, then if the in-chain heteroatom of X is closer to the quaternary nitrogen atom than the carbonyl group, then g+h≧2, and if the heteroatom is farther, then g+h≧1, e is 0–10, g and i are 0, h is 0–3, and the sum a+b+c+2d+e+g+h is about 10–22, "X" is selected from the group consisting of ester and amide;

"B" is an alkyl group of up to three carbon atoms;

"D" is selected from the group consisting of "A", linear and branched alkyl and alkenyl groups having 1–9 carbon atoms, phenyl, benzyl, and —$(CH_2CH_2O)_yH$ groups wherein y is 1–10, "E" is selected from the group consisting of "B", —$(CH_2CH_2O)_yH$— wherein y is 1–10, and 2-hydroxypropyl; and Y is an alkylsulfate ion.

4. The spandex of claim 3, wherein the quaternary amines have the formula:

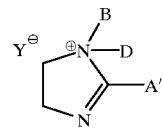

and wherein A' is $(CH_3)_a$—$(CH)_b$—$(CH_2)_c$—$(CH=CH)_d$—$(CH_2)_e$— wherein a is 1 or 2, b is 0 when a is 1 and b is 1 when a is 2, c is 5–18, d is 0 or 1, e is 0–10; and the sum of a+b+c+2d+3 is about 9–21.

5. The spandex of claim 3, wherein

"A" is $CH_3$—$(CH_2)_c$—$(CH=CH)_d$—$(CH_2)_e$— wherein c is 10–18, d and e are independently 0 or 1, the sum c+2d+e is about 10–22, "B" and "E" are each methyl; and "D" is selected from the group consisting of "A" and linear and branched alkyl and alkenyl groups having 1–9 carbon atoms.

6. The spandex of claim 1, wherein the quaternary amine additive is an oligomer of bis(4-isocyanatocyclohexyl)-methane) and at least one quaternary amine selected from the group consisting of N-t-butyl-N-methyldiethanolammonium alkylsulfate, N,N-dimethyldiethanolammonium alkylsulfate, and mixtures thereof.

7. The spandex of claim 5, wherein the quaternary amine is present at a level of about 5–35 meq/kg of spandex.

8. The spandex of claim 6, wherein the quaternary amine is present at a level of about 5–35 meq/kg of spandex.

9. The spandex of claim 3, wherein "D" is selected from the group consisting of linear and branched alkyl and alkenyl groups having 1–9 carbon atoms.

10. The spandex of claim 1, wherein non-quaternized amines are also included in the oligomers.

\* \* \* \* \*